(12) United States Patent
Raj et al.

(10) Patent No.: US 10,489,593 B2
(45) Date of Patent: Nov. 26, 2019

(54) MITIGATION OF MALICIOUS ACTIONS ASSOCIATED WITH GRAPHICAL USER INTERFACE ELEMENTS

(71) Applicant: Symantec Corporation, Mountain View, CA (US)

(72) Inventors: Vinith Balakrishnan Raj, Los Angeles, CA (US); Chengi Jimmy Kuo, Manhattan Beach, CA (US); Joe Winifred Poobalarayen, San Jose, CA (US); Mohit Jha, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 131 days.

(21) Appl. No.: 15/635,047

(22) Filed: Jun. 27, 2017

(65) Prior Publication Data

US 2018/0373872 A1 Dec. 27, 2018

(51) Int. Cl.
*G06F 21/56* (2013.01)
*G06F 21/62* (2013.01)
*G06F 16/245* (2019.01)
*G06F 21/83* (2013.01)

(52) U.S. Cl.
CPC .......... *G06F 21/566* (2013.01); *G06F 16/245* (2019.01); *G06F 21/629* (2013.01); *G06F 21/83* (2013.01); *G06F 2221/031* (2013.01); *G06F 2221/032* (2013.01)

(58) Field of Classification Search
CPC ............. H04L 63/1416; H04L 63/1433; H04L 63/1441; H04L 63/145; H04L 63/1425; H04L 63/14; H04L 9/32; H04L 9/321; G06F 21/552; G06F 21/566; G06F 21/00; G06F 21/51; G06F 21/562; G06F 21/554; G06F 21/36; G06F 21/577; G06F 21/564; G06F 21/33; G06F 21/56; G06F 21/64; G06F 21/55; G06F 21/561; G06F 3/04817; G06F 3/0482; G06K 9/00973
See application file for complete search history.

(56) References Cited

U.S. PATENT DOCUMENTS

| | | | |
|---|---|---|---|
| 8,312,539 B1 | 11/2012 | Nachenberg et al. | |
| 8,413,236 B1 * | 4/2013 | Hansen | G06F 21/50 726/22 |
| 8,844,039 B2 * | 9/2014 | Niemela | H04L 63/145 713/188 |
| 9,152,791 B1 * | 10/2015 | Shih | G06F 21/566 |
| 9,679,134 B1 | 6/2017 | Jing et al. | |
| 2008/0178288 A1 * | 7/2008 | Alperovitch | H04L 63/0227 726/22 |

(Continued)

OTHER PUBLICATIONS

International Search Report and Written Opinion for PCT/US2018/035178 filed May 30, 2018, dated May 9, 2019, 14 pgs.

*Primary Examiner* — Tae K Kim
(74) *Attorney, Agent, or Firm* — Patent Law Works LLP

(57) ABSTRACT

Mitigating malicious actions associated with graphical user interface elements may be performed by a computing device. A user interface element is monitored in a graphical user interface environment executing on the computing device. An association between the user interface element and a malicious action is determined. Access to the user interface element is blocked to prevent the malicious action.

20 Claims, 4 Drawing Sheets

(56) References Cited

U.S. PATENT DOCUMENTS

| | | | |
|---|---|---|---|
| 2011/0054918 A1* | 3/2011 | Hamilton, II | G06F 21/56 705/1.1 |
| 2012/0002839 A1* | 1/2012 | Niemela | G06K 9/00973 382/100 |
| 2012/0110174 A1* | 5/2012 | Wootton | G06F 21/564 709/224 |
| 2012/0311710 A1* | 12/2012 | Butler | G06F 21/51 726/24 |
| 2014/0130164 A1* | 5/2014 | Cafasso | H04L 63/1408 726/23 |
| 2014/0150106 A1* | 5/2014 | Butler | G06F 21/51 726/24 |
| 2015/0160813 A1* | 6/2015 | Filatov | H04L 63/10 715/741 |
| 2016/0036834 A1* | 2/2016 | Filatov | H04L 63/1408 726/22 |
| 2017/0004305 A1 | 1/2017 | Zakorzhevsky et al. | |

\* cited by examiner

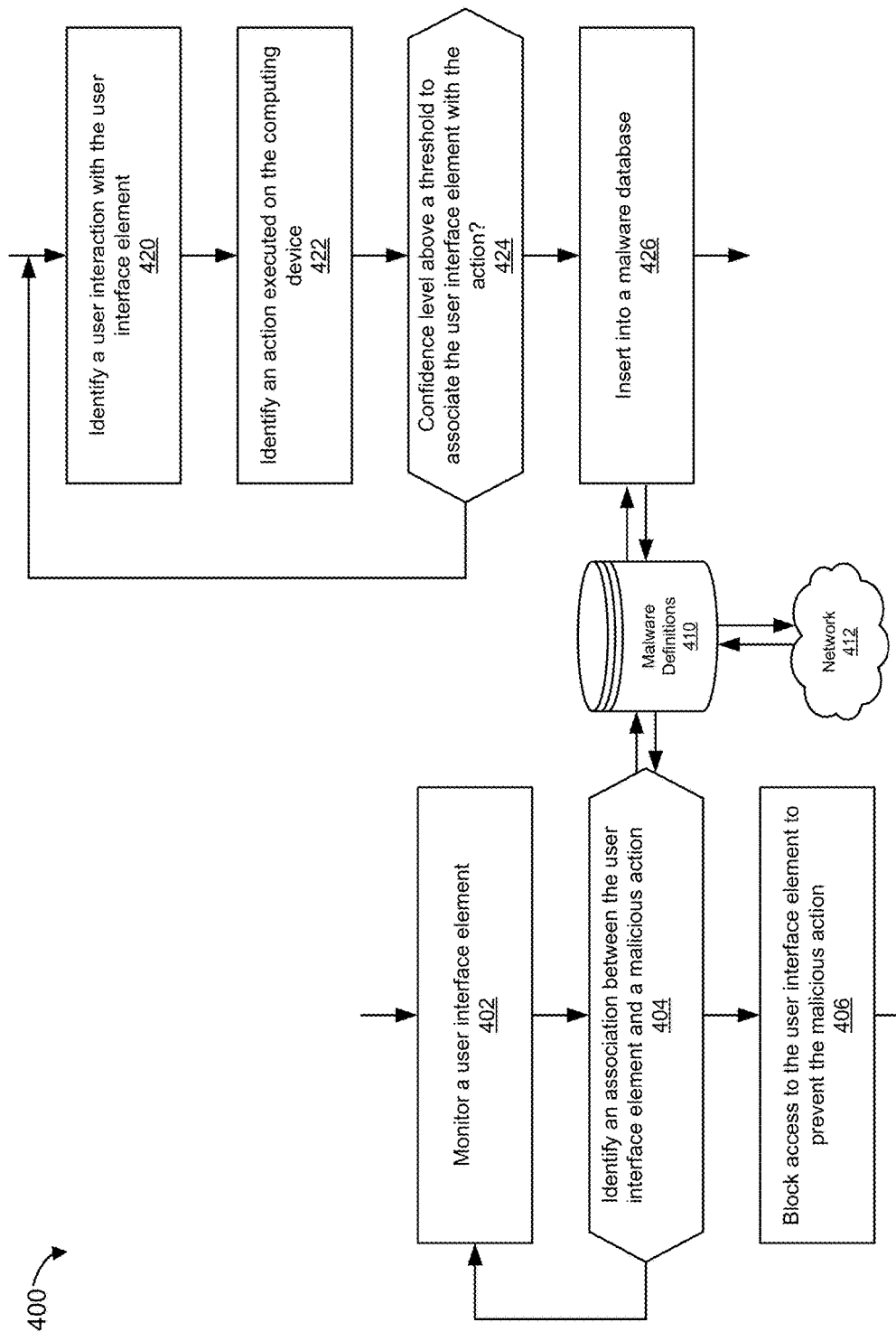

MITIGATION OF MALICIOUS ACTIONS ASSOCIATED WITH GRAPHICAL USER INTERFACE ELEMENTS

TECHNICAL FIELD

This disclosure pertains generally to computer security, and more specifically to mitigating malware in a graphical user interface (GUI) environment.

BACKGROUND

Malware such as computer viruses, worms, Trojan horses, ransomware, spyware, adware, etc., causes significant harm to computer systems and inconvenience to their users. With the ever increasing use of computer systems and the Internet, malware proliferation has exploded, with some computer analysts estimating that the release rate of malicious code and other unwanted programs may be exceeding that of legitimate software applications.

Conventional malware mitigation generally either detects and prevents installation of malware, and/or detects and removes malware that has already compromised a system. For example, some anti-malware systems scan a computer system's storage for the presence of known malware.

In graphical user environments (GUIs), malware may attach itself to useful application by modifying the event handlers of GUI elements. Some malware, such as spyware, may be intentionally embedded in legitimate, useful, applications. The perceived usefulness of anti-malware systems is sometimes determined in part on whether the systems "breaks" existing applications. Notification and/or removal of a malware threat that has attached to, or is intentionally embedded in, a legitimate application's GUI, may cause the user to believe that the anti-malware system has flagged a false-positive. Such a perception of false-positives may cause users to unwisely ignore or discontinue some or all of the protective capabilities of the anti-malware system. Even where the user understand that a true-positive has been flagged, the user may perceive the anti-malware system as lacking where the user still wishes to use portions of the application. For instance, a user may want to use an application with intentionally embedded spyware without encountering the negative effects of the spyware disclosing information without informed consent.

Without new reliable ways to mitigate malware, critical computing infrastructure may be more routinely compromised. These compromises may result in real-world system downtime, inconveniences to organizations and users, economic loss and may even threaten human safety.

It would be desirable to address these issues.

SUMMARY

A method for mitigating malicious actions associated with graphical user interface (GUI) elements is implemented with a computing device. A user interface element is monitored in a graphical user interface environment executing on the computer system. An association between the user interface element and a malicious action is identified. Access to the user interface element is blocked to prevent the malicious action while allowing the graphical user interface environment and an application associated with the user interface element to continue executing on the computer system.

Blocking access to the user interface element can be effectuated thought a variety of mechanisms. For example, a hook may be inserted into the user interface element. A popup message may grab the focus of the GUI environment, thereby preventing access to the user interface element. In some implementations, a human-computer interface (e.g., a mouse pointer) may be disabled. As another example, a window may be overlaid on top of the blocked user interface element.

The malicious action can be determined through a variety of mechanisms. For example, suspicious process behavior can be fingerprinted and compared to fingerprints in a malware database. In some cases, the malware database may be generated and maintained through crowd source reputations of user interface elements. Thus, in some instances, the user interface element may have various properties fingerprinted for insertion into the malware database. The malware database may also have a set of associated user interface elements that a particular malware is apt to attach to. In some cases, the malware may include application where the author intentionally embedded the application with malware (e.g., spyware). In some implementations, there may be a whitelist of safe user interface elements. User interface elements can also be signed, and in some cases authentication of the signature can be invalidated where malware has attached to the signed user interface element.

Some examples of properties used in identifying user interface elements include an automation identifier, a process identifier, a spatial identifier, etc. In some cases, these or other properties may have one or more sub-properties that can be used to identify or fingerprint a user interface element. For example, a process identifier may have an image file size, an executable file name, a memory footprint, a computer resource consumption fingerprint, etc.

The technology can be implemented to identify a user interaction with the user interface element, identify an action executed on the computer system, and associate the user interface with the action executed on the computer system by repeatedly determining a temporal proximity between the identified user interaction with the user interface element and the identified action executed on the computer system to establish a confidence level above a threshold.

In some implementations, the Windows application programming interface in the Microsoft Windows operating system (OS) may be used to implement portions of the technology. Other example OSs with GUI environments include macOS, Linux, and Chrome OS, amongst others. In other implementations, the GUI environment may be provided through a web browser. The web browser may have proprietary APIs and/or standardized APIs (e.g., standards promulgated by the World Wide Web Consortium (W3C), etc.).

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 4 is a flowchart of a method for malware mitigation in a GUI environment, according to some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Seemingly useful applications may masquerade malicious actions within the event handlers for user interface elements. For example, an application during a purchase transaction, may send not only the credit card information entered, but may also send other information stored on the computer that the application is executing on. As another example, the event handlers may initiate the downloading of malicious files. As another example, important OS files may be modified by malicious code evoked by event handlers of a legitimate application. In another case, a user interface element to update a system or software may unintentionally cause the system or software to fail or may otherwise adversely affect the system. In such instances, the technology can detect the presence of such a UI element and notify the user that the updates may be harmful and to wait until further patches are released. In some cases, the user may still want to use the application but remain protected against these potentially malicious user interface elements. Traditional anti-malware systems generally tend to block entire processes. Thus it may be desirable to safeguard the user from accessing certain user interface elements linked to malicious actions, while still allowing the user to use the underlying application associated with the user interface element.

Figure 1:
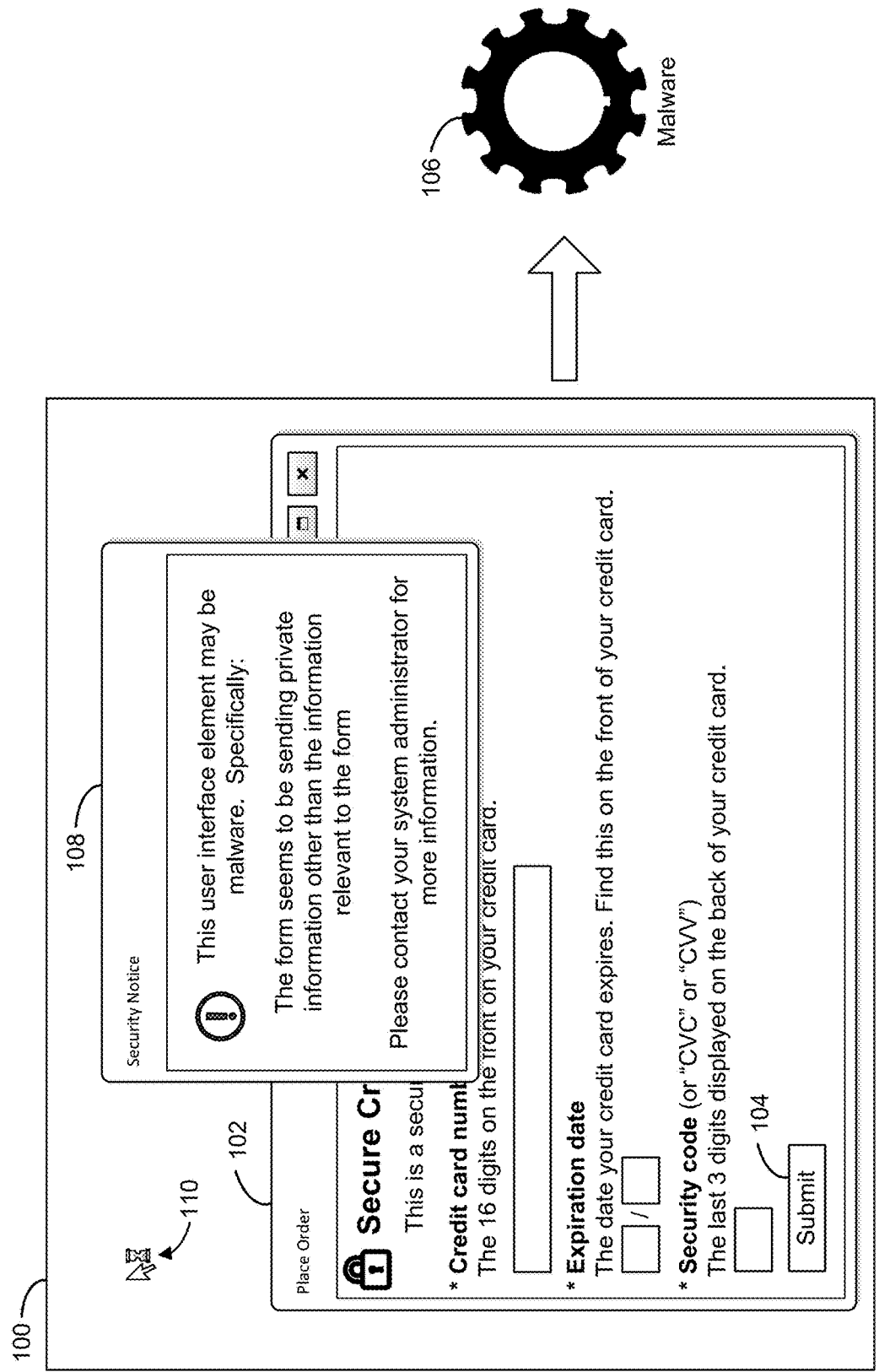
FIG. 1 is a schematic drawing of malware mitigation in a GUI environment, according to some embodiments.

FIG. 1 is a schematic drawing of malware mitigation in a GUI environment 100. Amongst other things, the GUI environment 100 includes a user interface window 102. For example, the user interface window 102 may be a portion of a user application. In the depicted example, the user interface window 102 is asking the user to input information as part of placing an order through an ecommerce system (e.g., credit card payment information). Thus, the user interface window 102 has a user interface element 104 (e.g., a "Submit" button) located on it. The user interface element 104 may invoke malware code 106, as indicated by the arrow, if the user interacts with the user interface element 104.

The GUI environment 100 may be one of several available GUI environments. For example, due to its large user base, Microsoft's Windows operating system is often a target of malware. Microsoft Windows exposes a common application programing interface (API) to implement some GUI functionality. The common API helps provide a consistent user experience, but can also be used by malware to masquerade or intermingle malicious code with legitimate code.

Other example OSs with GUI environments include macOS, Linux, Chrome OS, amongst others. For instance, Linux has several different GUI environments that it can run. Some examples include Gnome and KDE. Further, various GUI environments in Linux include sublayers of common GUI environments. One such example is the X Windows System (i.e., the X11 windowing system). Current implementations of macOS use the Aqua GUI environment. Another common GUI environment is a web browser. Some web browser implement portions of standardized APIs, such as those promulgated W3C, Ecma International (e.g., ECMA-262), etc. Additionally, some browsers, or browser extensions, may provide proprietary APIs. Regardless of the exact GUI environment, the GUI environment 100 has APIs that allow user applications to interface therewith.

As one example, the user interface window 102 may be generated with the hypertext markup language (HTML) and rendered in a web browser window.

The technology described herein, may block parts of an application's user interface to prevent the user from triggering malicious functionality that may be exposed by the application. In the depicted example, a popup window 108 is partially overlaid on top of the user interface window 102 containing the offending user interface element 104. In some implementations, the popup window 108 may grab the focus of the GUI environment. In some cases, a human computer interface (HCI) device may be disabled (e.g., the mouse pointer 110 may be disabled).

Figure 2:
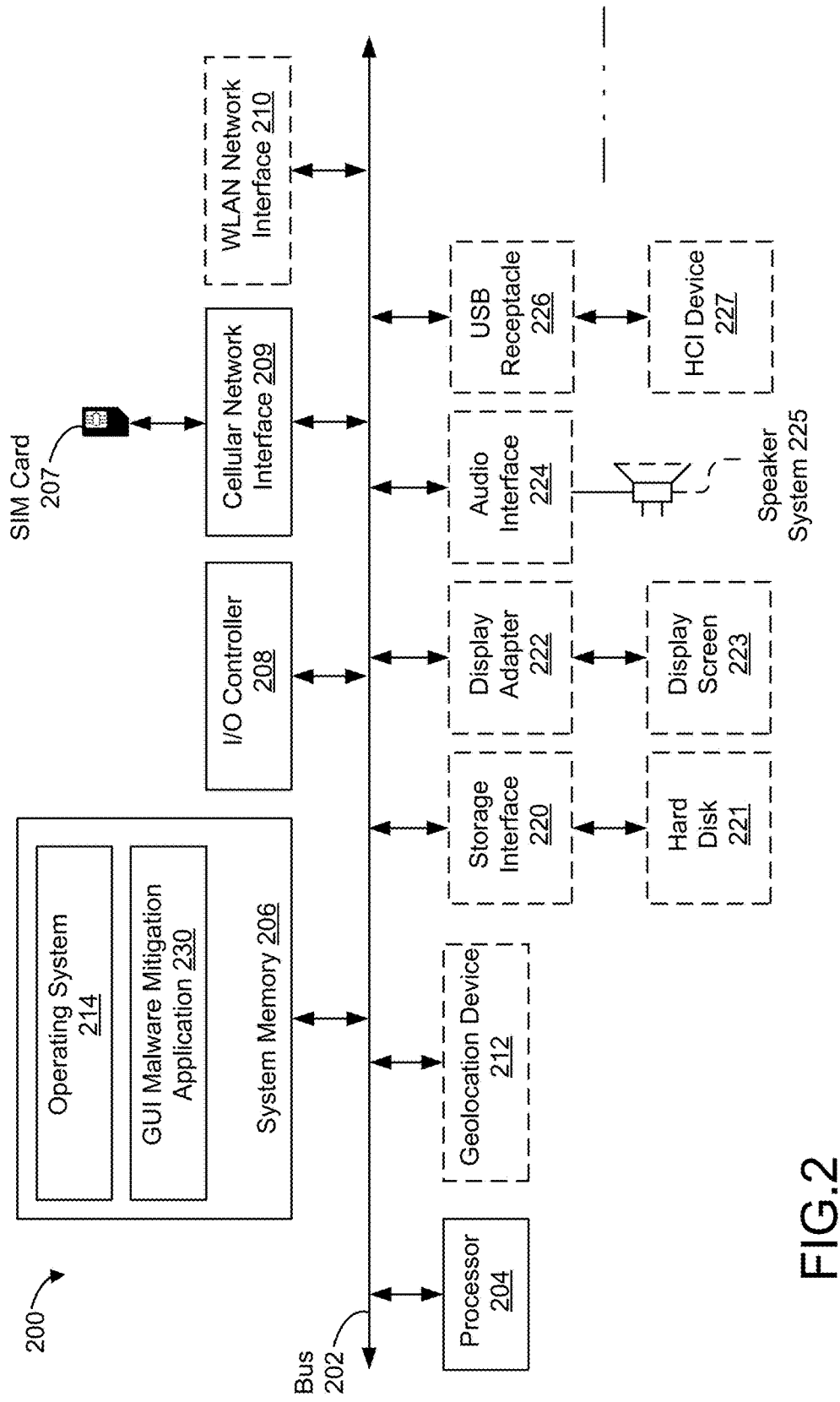
FIG. 2 is a block diagram of a computer system suitable for implementing a GUI malware mitigation application, according to some embodiments.

FIG. 2 is a block diagram of a computer system 200 suitable for implementing a GUI malware mitigation application 230. As illustrated, one component of the computer system 200 is a bus 202. The bus 202 communicatively couples other components of the computer system 200, such as at least one processor 204, system memory 206 (e.g., random access memory (RAM), read-only memory (ROM), flash memory), an input/output (I/O) controller 208, and a network interface 210.

The network interface 210 may include a variety of protocols to connect to local networks and/or the Internet. The bus 202 may also be communicatively coupled to other optional components such as a storage interface 220 communicatively coupled to one or more hard disk(s) 221 (or other form(s) of storage media), a display adapter 222 communicatively coupled to a video output device such as a display screen 223, an audio output interface 224 communicatively coupled to an audio output device such as a speaker 225, and one or more interfaces such as a universal serial bus (USB) receptacle 226 communicatively coupled to various peripherals such as human-computer interaction (HCI) devices 227 (e.g., keyboard, mice, sensors, etc.).

The bus 202 allows data communication between the processor 204 and system memory 206, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 221, flash memory, ROM, etc.) and loaded into system memory 206 and executed by the processor 204. Application programs can also be loaded into system memory 206 from a remote location, for example via the network interface 210. In FIG. 2, a GUI malware mitigation application 230 is illustrated as residing in system memory 206. The workings of the GUI malware mitigation application 230 are explained in greater detail below in conjunction with FIGS. 3 and 4.

An operating system 214 is also illustrated as residing in system memory 206. The operating system 214 may provide an interface between applications and hardware of the computer system 200. For instance, the operating system

214 may include drivers to control and receive data from the network interface 210, display adapter 222, USB Receptacle 226, HCI device 227, etc. Further, the operating system 214 may include an application programming interface (API) to provide application programs such as the GUI malware mitigation application 230 access to operating system services. The operating system 214 may also provide a common GUI environment for applications.

The storage interface 220 is coupled to one or more hard disks 221 (and/or other standard storage media). The hard disk(s) 221 may be a part of computer system 200, or may be physically separate and accessed through other interface systems.

Figure 3:
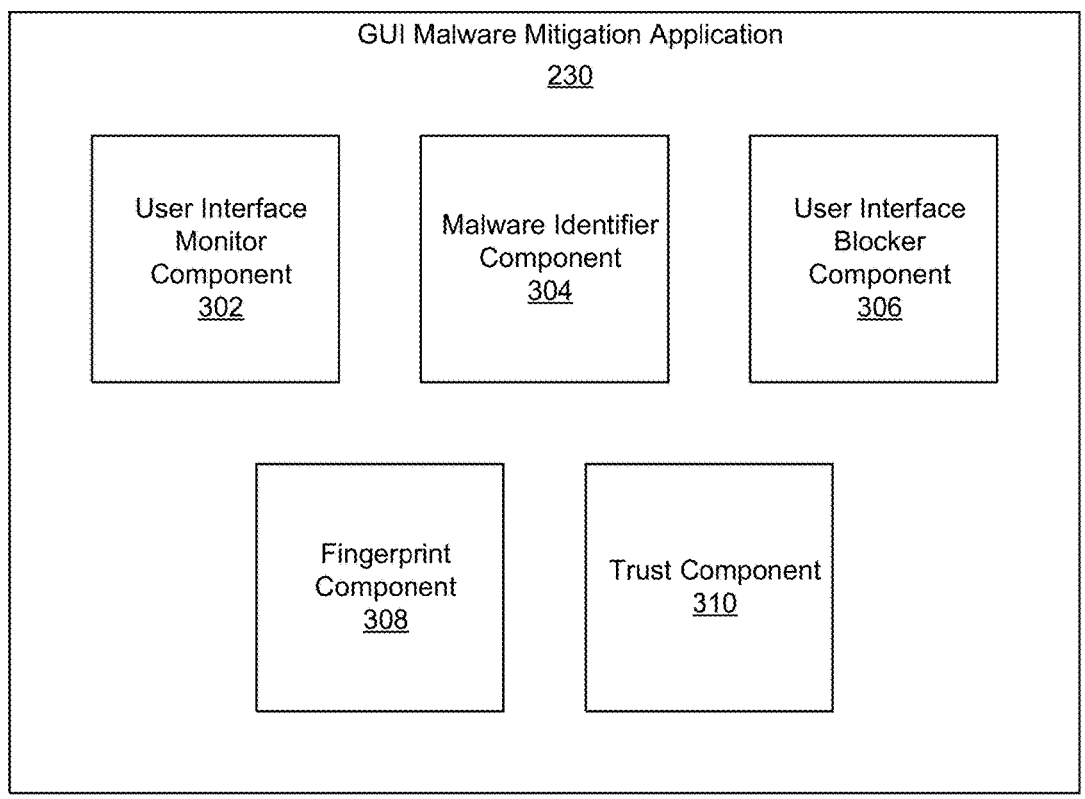
FIG. 3 is a block diagram of a GUI malware mitigation application, according to some embodiments.

For simplicity of discussion, the remaining figures are discussed together below. FIG. 3 is a block diagram of a GUI malware mitigation application 230. FIG. 4 is a flowchart of a method 400 for malware mitigation in a GUI environment.

As discussed above, the GUI environment may be one of a variety of available GUI environments found in modern OSs. One particular example is the Win32 GUI environment in Microsoft Windows. In another example, the GUI environment may be a web browser. In a further example, the GUI environment may be a combination of an OS GUI environment (e.g., Win32) and a web browser running within the OS GUI environment (e.g., Mozilla Firefox, Chrome, etc.). Further, and as discussed above, the GUI malware mitigation application 230 may be loaded into memory 206 of the computer system 200. In some cases, the GUI malware mitigation application 230 may be a resident module that stays in memory 206 throughout the lifetime of the computing session. In some embodiments, the GUI malware mitigation application 230 may include components loaded directly within the OS and/or components loaded into a browser executing within the OS.

The user interface monitor component 302 includes code to monitor 402 a user interface element 104 in a GUI environment 100 executing on the computer system 200. In general, the user interface monitor component 302 may monitor several user interface elements in a GUI environment. In monitoring the user interface elements, the user interface monitor component 302 may identify various properties of the user interface elements.

For example, in some GUI environments the user interface elements may have automation identifiers attached to them. These automation identifiers are generally used to automate interaction with the GUI environment using a scripting language. For instance, in Microsoft Windows, the Windows Scripting Host (WSH) is a scripting environment that can use unique automation identifiers associated with user interface elements. Thus, these automation identifiers can profile and identify user interface elements uniquely across multiple application GUIs.

User interface elements encompass a variety of components used in GUI environments. This includes items such as buttons, links, check-boxes, etc. In general, a user interface element is a portion of an application GUI that a user can interact with.

The malware identifier component 304 includes code to identify 404 an association between the user interface element 104 and a malicious action 106. Thus, the malware identifier component 304 enables correlation of user interactions with user interface elements and the impact of such actions on the computer system 200 to determine if they result in malicious actions on the computer system 200. In some implementations, identifying the association between the user interface element 104 and the malicious action 106 includes querying a malware database (e.g., malware definitions 410) with a property of the user interface element 104.

The malware identifier component 304 may look up the association in a malware definitions 410 file or database. The malware definitions 410 generally associate user interface elements with actions, reputations, and/or trust levels. Moreover, the malware definitions 410 may link various properties of user interface elements together into a user interface element fingerprint to help determine whether a particular user interface element is the same user interface element referenced in the malware definitions 410.

In some cases, the malware definitions 410 may be crowd sourced through multiple computers linked together over a network 412. In this way, the malware definitions 410 may be stored in, and accessed through, a cloud service, and may be continually updated as remote computers heuristically discover new user interface elements and GUI malware. In some cases, remote users may make an indication when a user interface element is suspect of maliciousness. In some embodiments, entries in the malware definitions 410 may be included by computer security researchers (e.g., a computer security company, a non-profit computer research organization, etc.).

Creation and maintenance of the malware definitions 410 is discussed below in further detail with reference to boxes 420, 422, 424, and 426 below. In this context, it should be understood that the boxes 420, 422, 424, and 426 may be executed on the same computer as boxes 402, 404, and 406 are performed, but also may be instantiated on remote computers connected together by the network 412.

If upon querying the malware definitions 410 database, the malware identifier component 304 determines that the particular user interface element is safe or otherwise harmless, the method 400 may continue to monitor 402 other user interface elements with the user interface monitor component 302. In some cases, the user interface monitor component 302 may also continue to monitor the particular user interface element that it has already looked up. For example, the particular user interface element may fall within a threshold range that is inconclusive as to whether the particular user interface element is safe or malicious. In another example, the user interface monitor component 302 may continue monitoring of the particular user interface element on a periodic basis to assure that the particular user interface element continues to be untainted by malware. In some implementations, the user interface monitor component 302 may continually monitor all active user interface elements in a GUI environment. Regardless of the exact implementations details of blocks 402 and 404, when a malicious user interface element is detected, access to the user interface element is blocked 406.

Accordingly, the user interface blocker component 306 includes code to block 406 access to the user interface element 104 to prevent the malicious action 106 while allowing the graphical user interface environment 100 and an application associated with the user interface element 104 to continue executing on the computer system 200. In this way, the user interface blocker component 306 provides a mechanism to prevent access to user interface elements. For example, the user interface blocker component 306 can insert a hook, produce a popup message, disable use of a human-computer interface, or overlay a window, amongst other things, to prevent access to a user interface element.

In some cases, the user interface blocker component 306 may also provide a notification mechanism for communicating information to the user. For example, the popup window 108 depicted in FIG. 1, clearly indicates to the user the reason why access to the user interface element 104 has been blocked. Other ways of communicating information to the user may also be used. In some cases, notification may also be provided to a system administrator in an enterprise environment. For example, an email with detailed information about the identified GUI malware may be sent to one or more system administrators in an organization. In some cases, the malware definitions include a description of the alleged maliciousness of the user interface element, and the notification mechanism may communicate the description so that a user can decide whether to continue use of the user interface element.

The fingerprint component 308 includes code to identify 420 a user interaction with the user interface element, and identify 422 an action executed on the computer system. The fingerprint component 308 can thereby correlate user interface interactions and their impact on the computer system 200. For instance, if a user's selection of a particular button causes a malicious file to be downloaded, the button may be uniquely identified and categorized as having a low reputation. In some cases, establishing the correlation between the interaction with the user interface element and the impact on the computer system 200 may need to be established over a period of time. This may be particularly true of new, unidentified threats due to the changing nature of malware threats. Some actions may be considered more malicious than other actions and have a maliciousness score based thereon. For example, destruction of user data may be considered more malicious than mining user preferences or social network information.

Thus, the fingerprint component 308 can also include code to associate 424 the user interface with the action executed on the computer system. In some embodiments, this may be done by repeatedly determining a temporal proximity between the identified user interaction with the user interface element and the identified action executed on the computer system to establish a confidence level above a threshold. Once the correlation between user interface element and a malicious action has been established, the malware identifier component 304 can insert 426 the correlation into the malware definitions 410.

In some implementations, the insertion into the malware definitions 410 may include one or more properties of the user interface element 104 and one or more properties of the associated action 106 executed on the computer system 200. For example the user interface element 104 may have uniquely identifiable properties such as an automation identifier, a process identifier, or a spatial identifier. A process identifier may include items such as an image file size, an executable file name, a memory footprint, a computer resource consumption fingerprint, etc. Thus, the malware definitions 410 file or database may be generated to contain a list of known malicious user interface elements for use by the GUI malware mitigation application 230. In some cases, the malware definitions 410, may include definitions (e.g., properties, fingerprints, etc.) of determined harmless user interface elements. Thus, in some cases the method can be used not only to identify threatening user interface elements, but also to quickly identify safe user interface elements.

In some cases, the GUI malware mitigation application may include a trust component 310 with code to determine that the user interface element is whitelisted or signed. Where the user interface element is whitelisted or signed the trust component 310 may communicate with other components of the GUI malware mitigation application 230 to allow access to the user interface element. For example, the trust component 310 may notify the malware identifier component 304 to disregard a user interface element with a particular fingerprint. As another example, the trust component 310 may notify the user interface monitor component 302 to discontinue monitoring a user interface element with a particular set of properties.

As will be understood by those familiar with the art, the invention may be embodied in other specific forms without departing from the spirit or essential characteristics thereof. Likewise, the particular naming and division of the portions, apps, components, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for mitigating malicious actions associated with graphical user interface elements, at least a portion of the method being performed by a computing device comprising at least one processor, the method comprising the steps of:
    monitoring, by the computing device, a user interface element in a graphical user interface environment of an application executing on the computing device;
    identifying, by the computing device, an association between the user interface element and a malicious action, based on determining a temporal proximity between a user interaction with the user interface element and an occurrence of the malicious action, wherein determining the temporal proximity between the user interaction with the user interface element and the occurrence of the malicious action comprises repeatedly determining the temporal proximity between the user interaction with the user interface element and the occurrence of the malicious action to establish a confidence level above a threshold; and
    blocking, by the computing device, access to the user interface element to prevent the malicious action from executing, while allowing the application and the graphical user interface environment to continue executing on the computing device.

2. The method of claim 1, wherein identifying the association between the user interface element and the malicious action comprising querying, by the computing device, a malware database with a property of the user interface element.

3. The method of claim 1, wherein the association between the user interface element and the malicious action is identified based on a crowd sourced reputation of one or more properties of the user interface element.

4. The method of claim 1 further comprising:
    identifying, by the computing device, the user interaction with the user interface element;
    identifying, by the computing device, the malicious action executed on the computing device; and responsive to identifying the association between the user interface element and the malicious action, inserting, by the computing device, into a malware database a property of the user interface element and a property of the associated action executed on the computing device.

5. The method of claim 4, wherein the property of the user interface element is at least one of: an automation identifier, a process identifier, and a spatial identifier.

6. The method of claim 5, wherein the process identifier is at least one of: an image file size, an executable file name, a memory footprint, and a computer resource consumption fingerprint.

7. The method of claim 1, further comprising:
determining, by the computing device, that the user interface element is whitelisted or signed; and
allowing, by the computing device, access to the user interface element.

8. The method of claim 1, wherein blocking access to the user interface element comprises at least one of: inserting a hook, producing a popup message, disabling use of a human-computer interface, and overlaying a window.

9. The method of claim 1, wherein the monitoring, the identifying, and the blocking are performed using the Windows application programming interface in the Microsoft Windows operating system.

10. A computer system for mitigating malicious actions associated with graphical user interface elements, the computer system comprising:
system memory;
a user interface monitor component residing in the system memory, the user interface monitor component being programmed to monitor a user interface element in a graphical user interface environment of an application executing on the computer system;
a malware identifier component residing in the system memory, the malware identifier component being programmed to identify an association between the user interface element and a malicious action, based on determining a temporal proximity between a user interaction with the user interface element and an occurrence of the malicious action, wherein determining the temporal proximity between the user interaction with the user interface element and the occurrence of the malicious action comprises repeatedly determining the temporal proximity between the user interaction with the user interface element and the occurrence of the malicious action to establish a confidence level above a threshold;
a user interface blocker component residing in the system memory, the user interface blocker component being programmed to block access to the user interface element to prevent the malicious action from executing, while allowing the application and the graphical user interface environment to continue executing on the computing device; and
at least one processor configured to execute the components.

11. The computer system of claim 10, wherein identifying the association between the user interface element and the malicious action comprising querying a malware database with a property of the user interface element.

12. The computer system of claim 10, wherein the association between the user interface element and the malicious action is identified based on a crowd sourced reputation of one or more properties of the user interface element.

13. The computer system of claim 10 further comprising:
a fingerprint component residing in the system memory, the fingerprint component being programmed to: identify the user interaction with the user interface element, and identify the malicious action executed on the computer system; and
wherein the malware identifier component is further programmed to responsive to identifying the association between the user interface element and the malicious action, insert into a malware database a property of the user interface element and a property of the associated action executed on the computer system.

14. The computer system of claim 13, wherein the property of the user interface element is at least one of: an automation identifier, a process identifier, and a spatial identifier.

15. The computer system of claim 14, wherein the process identifier is at least one of: an image file size, an executable file name, a memory footprint, and a computer resource consumption fingerprint.

16. The computer system of claim 10, further comprising a trust component residing in the system memory, the trust component being programmed to determine that the user interface element is whitelisted or signed, and allow access to the user interface element.

17. The computer system of claim 10, wherein blocking access to the user interface element comprises at least one of: inserting a hook, producing a popup message, disabling use of a human-computer interface, and overlaying a window.

18. The computer system of claim 10, wherein the monitoring, the identifying, and the blocking are performed using the Windows application programming interface in the Microsoft Windows operating system.

19. At least one non-transitory computer readable-storage medium for mitigating malicious actions associated with graphical user interface elements, the at least one non-transitory computer readable-storage medium storing computer executable instructions that, when loaded into computer memory and executed by at least one processor of a computing device, cause the computing device to:
monitor, by the computing device, a user interface element in a graphical user interface environment of an application executing on the computing device;
identify, by the computing device, an association between the user interface element and a malicious action, based on determining a temporal proximity between a user interaction with the user interface element and an occurrence of the malicious action, wherein determining the temporal proximity between the user interaction with the user interface element and the occurrence of the malicious action comprises repeatedly determining the temporal proximity between the user interaction with the user interface element and the occurrence of the malicious action to establish a confidence level above a threshold; and
block, by the computing device, access to the user interface element to prevent the malicious action from executing, while allowing the application and the graphical user interface environment to continue executing on the computing device.

20. The non-transitory computer readable-storage medium of claim 19, wherein identifying the association between the user interface element and the malicious action comprising querying, by the computing device, a malware database with a property of the user interface element.

* * * * *